(12) United States Patent
Arndt et al.

(10) Patent No.: US 6,252,396 B1
(45) Date of Patent: Jun. 26, 2001

(54) MOVING OBJECT CONTROL SYSTEM

(75) Inventors: G. Dickey Arndt, Friendswood; James R. Carl, Houston, both of TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/535,669

(22) Filed: Mar. 24, 2000

Related U.S. Application Data

(62) Division of application No. 08/944,040, filed on Sep. 29, 1997, now Pat. No. 6,097,189.

(51) Int. Cl.$^7$ ..................................................... G01B 7/14
(52) U.S. Cl. ........................... 324/207.17; 324/207.23; 702/150; 342/463
(58) Field of Search ..................... 324/207.11, 207.22, 324/207.23, 207.16, 207.17; 702/150, 151, 152, 153; 340/825.06; 342/36, 454, 455, 456, 463

(56) References Cited

U.S. PATENT DOCUMENTS 4,642,786 * 2/1987 HAnsen ........................... 324/207.17

* cited by examiner

Primary Examiner—Walter E. Snow
(74) Attorney, Agent, or Firm—Hardie R. Barr

(57) ABSTRACT

A method is provided for controlling two objects relatively moveable with respect to each other. A plurality of receivers are provided for detecting a distinctive microwave signal from each of the objects and measuring the phase thereof with respect to a reference signal. The measured phase signal is used to determine a distance between each of the objects and each of the plurality of receivers. Control signals produced in response to the relative distances are used to control the position of the two objects.

5 Claims, 5 Drawing Sheets

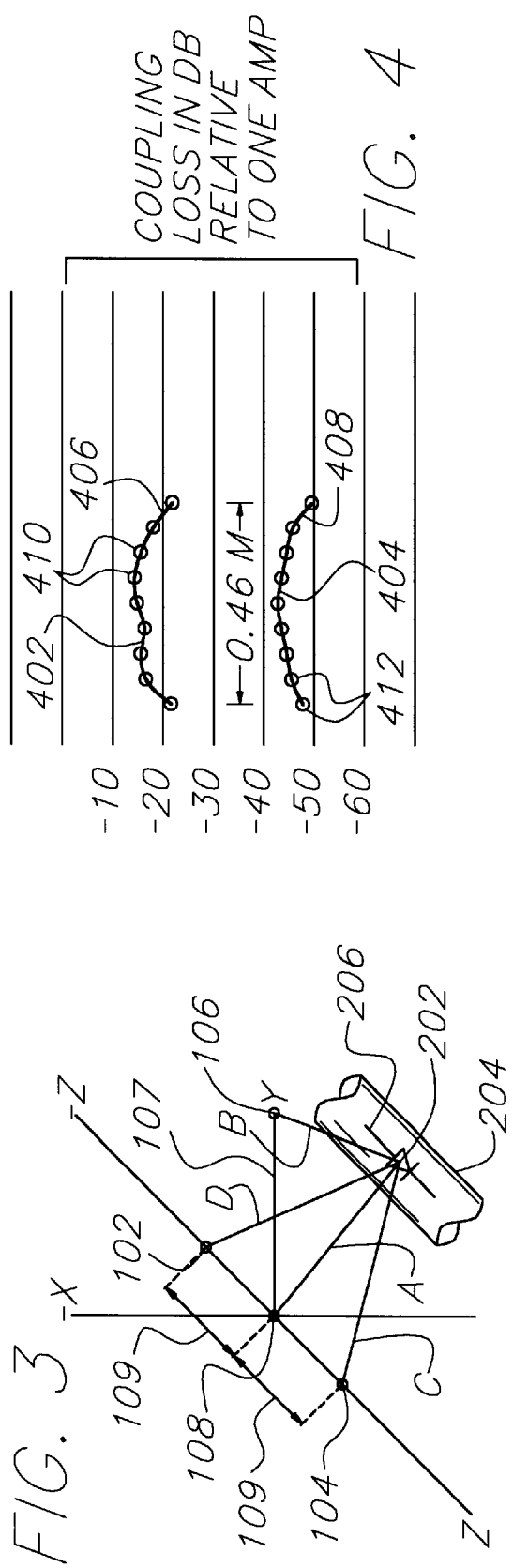

MOVING OBJECT CONTROL SYSTEM

This is a divisional application of presently application Ser. No. 08/944,040 filed Sep. 29, 1997, which is incorporated herein and made a part hereof, now U.S. Pat. No. 6,097,189.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

1. TECHNICAL FIELD

The present invention relates generally to a system and method for locating an object positioned in the same or in a different medium as the sensing device. More specifically, one embodiment of the invention is directed to locating a buried object such as a pipe, conduit, or cable but the invention may also be used to monitor movement of an object in air or space that is proximately or closely positioned with respect to the system of the present invention.

2. DESCRIPTION OF THE BACKGROUND

Devices have long been available for detecting buried pipes or other objects. However, presently available devices have significant drawbacks that prevent their reliably locating the underground object in question with a sufficiently high accuracy required for desired operability, e.g., within one or two centimeters. As well, most prior art devices take considerable time to locate the object. They require many discrete tests or continuous searching so that the search time is typically rather long. As well, these devices tend to have little or no value for locating, for instance, the path of movement of proximate objects on the surface or in air with high accuracy as may desired for many various purposes ranging as widely as from robotic control to analyzing the path of a golf swing.

More specifically, prior art devices do not have sufficiently high underground locating accuracy (within 1 or 2 centimeters) for two dimensional X-Y positioning, e.g., positioning relative to surface landmarks. They also lack or do not provide sufficient accuracy (within 1 or 2 centimeters) for three dimensional X-Y-Z positioning, i.e., positioning that provides depth information as well as relationships to surface landmarks. Furthermore, the accuracy of most or all prior art detectors or methods of detection are very sensitive to depth and rapidly lose accuracy and reliability with increasing depth of the buried object. Variable soil conditions significantly affect the operation of presently available detectors to the extent that the same readings are not consistently obtained if ground conditions change. Presently available devices for locating buried objects can be categorized in roughly five classifications that are discussed below.

Records are often used to locate buried pipes. However, records may be inaccurate or unhelpful for many reasons, some of which are discussed here. For instance, records may be permanently lost, or they may be temporarily lost due to improper filing in a large filing system, or they also become torn, faded, or otherwise unreadable in whole or relevant part. References required by records such as landmarks may be lost, survey errors can arise due to improper or inaccurate measurements or recording, unmarked or inaccurately recorded repairs can invalidate records, new local structures can be built, and numerous other changes may occur with time to cause inaccuracies in records.

Presently available electromagnetic and/or magnetic object locators require the object to be within about three feet of the surface. Otherwise, the signals for detection are so greatly attenuated by the earth that they may be unusable or take considerable time to evaluate. The object to be located with such systems must be metallic and must be sufficiently large to produce an adequate signal. Since the detection must occur within about three feet, the approximate relative position of the object must be known or determinable to avoid significant time delays in locating the object. Even after detection is accomplished, it is often difficult or impossible to know whether the detector instrument is directly over the buried object (X-Y position determination inaccuracy) due to signal variations that are related to factors other than proximity of the object such as shape and orientation of the buried object. Three dimensional accuracy that includes the depth or Z coordinate is typically not available with such systems.

Various types of buried markers may be used to improve the accuracy of the detectors. For instance, magnets may be buried alongside of the object to be detected. However, magnets that are strong enough to be detected without excessive false signals tend to be expensive and have a relatively limited lifetime. Other types of markers have been used, such as inductive wire loops and/or capacitive resonant circuits. However, these markers may require accurate positioning or placement to avoid errors in determining when the detector instrument is directly above the object. Furthermore, the marker inaccuracies due to inexact placement, e.g., horizontal loop positioning, will often increase with increasing depth. As well, the depth of the object must not be too great to cause excessive signal attenuation so that signals become too weak for reliable detection.

Soil conditions that affect the above discussed detectors also complicate operation of active and passive acoustic detectors. For instance, dry unconsolidated sand may cause a loss of signal in acoustic detectors because dry, loose soil conditions are not conducive to efficiently conveying the required level acoustic energy for accurate measurements. Variations in the soil such as harder regions or tree roots or rocks may falsely indicate the detection of the desired object. The relatively close proximity of a target, such as a buried pipe, may also present a significant problem for some types of acoustic imaging and acoustic holography.

Ground probing radar has been used in the past with only limited success. Moisture content of the soil must be relatively low for adequate accuracy. As well, homogeneity of the soil should be high. Even if these two requirements are met, a trained professional operator is necessary. Ground probing radar presently does not work well enough to satisfy the requirements of the natural gas industry.

Because of the long-felt need to provide a means for detecting buried objects, numerous inventors have attempted to provide systems for this purpose. The following patents discuss some of the efforts that have been put forth in this area to solve such problems.

U.S. Pat. No. 4,767,237 issued Aug. 30, 1988, to Cosman et al., discloses a marking tape that is positioned underground and above utility lines. The marking tape carries a pair of closely spaced, parallel insulated conductors that extend along the length of the tape and at least one other insulated conductor extending along the length of the tape which is separated from the pair of conductors at a distance that is greater than the distance between the conductors of the pair of conductors. Passive markers having a resonant circuit can be selectively placed along the tape so that the resonant circuit is electromagnetically coupled to the pair of conductors and the other conductor.

U.S. Pat. No. 4,001,822 issued Jan. 4, 1977, to Fred Sterzer, discloses an electronic license tag or plate formed into a unitary structure and including a single antenna system cooperating in a system comprising a harmonic radiator which transmits a pulse coded identification signal in response to an interrogation signal.

U.S. Pat. No. 4,118 662 issued Oct. 3, 1978, to Harold Weber, discloses a method and apparatus for locating concealed or buried structures. The portable device couples, either by direct or indirect connection, high frequency alternating current energy into a more conductive structure that is usually obscured in a less conductive medium.

U.S. Pat. No. 4,673,932 issued Jun. 16, 1987, to Ekchian et al., discloses a computerized transceiver that repeatedly sweeps through a set of frequencies to interrogate a plurality of groups of items in a shelf. Items in each group are tagged with a printed circuit antenna tuned to frequencies assigned to each group.

U.S. Pat. No. 5,099,227 issued Mar. 24, 1992, to Theodore Geiszler, discloses a proximity detection system that combines the advantages of an electric field coupling mechanism with those of an electromagnetic coupling mechanism to overcome the disadvantages of the respective individual coupling mechanisms. Data is transmitted to the receiver using both an electric field coupling mechanism and an electromagnetic field coupling mechanism. The receiver is provided with a preamplifier circuit that can simultaneously receive signals using either or both of these coupling mechanisms.

U.S. Pat. No. 5,017,415 issued May 21, 1991, to Cosman et al., discloses a marker tape for locating a buried conduit that has a plurality a electronic markers spaced thereon at predetermined intervals. The tape is a nonconductive ribbon and the markers are preferably passive circuits tuned to a specific frequency. The markers may be oriented in a predetermined pattern.

U.S. Pat. No. 4,147,973 issued Apr. 3, 1979, to Harold Weber, discloses a device that accepts first, or higher, frequency electromagnetic signals of various average levels and produces a second, or lower, frequency output, the rate of which varies in relation to the average first frequency level.

U.S. Pat. No. 4,263,552, issued Apr. 21, 1981, to Harold Weber, discloses a portable device that produces an indication of the relative direction of lay for a covert structure. Two signals are produced, one signal for each ear, that provide a "right" or "left" orientation relative to the covert structure.

U.S. Pat. No. 4,866,388, issued Sep. 12, 1989, to Cosman et al., discloses a method and system for determining the location of a first insulated conductor and a plurality of similar branch conductors that are branches of the first conductor. A passive marker having a resonant circuit that includes an inductor and a capacitor is provided for each of the branch conductors and is positioned to be inductively coupled to the first conductor and the associated branch conductor.

U.S. Pat. No. 3,914,762, issued Oct. 21, 1975, to Richard Klensch, discloses an electronic detection and identification system operating with microwave frequencies wherein a transmitted continuously transmits a beam of electromagnetic energy, in a predetermined direction, so as to impinge on an identification tag suitably attached on a passing object. The identification tag then radiates a beam of energy at a harmonic frequency that contains an identification code. The receiver generates signals representative of the identification code.

U.S. Pat. No. 4,255,710, issued Mar. 10, 1981, to Harold Weber, discloses a metal detector that employs a beat frequency oscillator and at least two search oscillators. The search oscillators each include a loop antenna. The two search oscillators produce two signals that are used to provide left-hand and right-hand indication of a buried object.

U.S. Pat. No. 4,314,373, issued Feb. 2, 1982, to Robert Sellers, discloses a passive transmitter that includes a varactor diode. The varactor diode produces a harmonic output when the tuned circuit is energized from a source of electromagnetic radiation.

U.S. Pat. No. 5,438,266, issued Aug. 1, 1995, to Tony H. S. Tsang, discloses a method and system for locating buried conductors, specifically a substation grounding grid. The apparatus indicates location of the conductors as it is passed across the ground surface. The search unit has a vertical axis coil tuned to pick up a signal that is generated from a power unit, applied to the conductors, which signal is interpreted for phase reversal.

U.S. Pat. No. 4,119,908 issued Oct. 10, 1978, to Cosman et al., discloses systems and methods for locating points along an underground conductor wherein tuned passive marker elements are disposed adjacent and alongside the conductor at certain points. A transmitted signal is coupled to the conductor to create a field about the conductor so that a receiver swung back and forth laterally of the conductor will have a peak-null-peak output. However, as a marker is approached, the receiver will have a peak output in the normally null region due to a field generated by the passive marker element to thereby locate the passive marker element.

U.S. Pat. No. 5,045,368, issued Sep. 3, 1991, to Cosman et al., discloses a marked conduit having a plurality of electronic markers spaced thereon at predetermined intervals. The distance between the markers encodes information about the buried conduit. The markers are preferably passive circuits tuned to a specific frequency. The markers may be oriented in a predetermined pattern to provide additional information. The markers may be attached to the outer or inner surface of the conduit, or may be imbedded in the wall of the conduit.

U.S. Pat. No. 4,873,533, issued Oct. 10, 1989, to Tomoyasu Oike, discloses a marker a buried object. The marker includes a passive resonant circuit that becomes inoperative when the initial position of the buried marker is changed. A lead wire or mercury switch opens to break the marker circuit when the initial position of the marker is altered.

U.S. Pat. No. 4,757,315, issued Jul. 12, 1988, to Lichtenberg et al., discloses a system for measuring distance that includes a transmitter and a transponder. The signal transmitted is reflected with the transmitted and reflected signal phases being compared to determine the distance between the transmitter and the transponder. In one embodiment, the transponder generates a harmonic of the transmitted signal.

The prior art devices discussed above do not take into account varying earth conditions and may simply not operate at varying depths of up to several, meters. Such conditions can produce significant signal variations that make location of a buried object unlikely. Even when working under ideal conditions, the prior art does not disclose an accurate means for quickly locating a buried object within centimeters of its relative position.

Furthermore, the prior art also does not provide a suitable device for accurately sensing the position of a proximate but movable object that may or may not be underground. Satellite positioning systems have found great utility for locating the position of an object on the earth. However, such a system requires several satellites positioned appropriately about the earth and still does not readily provide three dimensional data. Also the resolution of such systems is not useful for determining relatively small movements of objects proximate or close to a tracking system and for tracking the same. Directional antennas may also be used to triangulate the position of an object but this information does not determine three dimensional positioning and may take some considerable time to obtain a fix on the object. Such systems may not have a response time suitable for tracking the desired rate of movement due to the need for physically controlling movement of three different antennas. As well, a directional antenna with means for determining distance to an object may be able to locate a position of an object but will not necessarily be able to readily follow an object due to the need for physical movement of the directional antenna and appropriate programming. This is especially true for tracking an object closely proximate to the antenna, as may be desirable with, for example, ergodynamic studies.

Consequently, there remains a need for a method and system to provide the position of buried objects, as well as proximately located non-buried objects, quickly and accurately. Preferably, the device should also be operable for locating the position of the object in mediums that may have variable conductivities and permittivities. The device should also be able to locate objects with high accuracy in the same medium as may be desired for many applications. Those skilled in the art have long sought and will appreciate the present invention that addresses these and other problems.

SUMMARY OF THE INVENTION

The proximate object locating system and method of the present invention may be used in air but may also be used in substantially solid materials such as a wide variety of soils or earth formations having different conductivities and relative permittivities. The proximate object locating system is more accurate in air or space because such media are highly homogenous and uniform. The present invention and method operates quickly to provide an accurate relative position of buried objects, such as buried natural gas pipelines.

A method for locating a buried object is disclosed that comprises: determining an indicia of relative permittivity of material in which the object is buried, selecting a transmitter frequency that is: (1) low enough to provide sufficient soil penetration based on the indicia of relative permittivity and (2) high enough to keep the transmitting antenna less than about one meter in length, selecting a marker antenna for reradiating a signal with a frequency having sufficient soil penetration to be detected at the surface as determined from the conductivity, positioning a marker antenna in the vicinity of the buried object, and detecting the reradiated signal from the marker antenna.

The method may provide for one or more of the following actions such as: determining an indicia of conductivity of material in which the object is buried, detecting the reradiated signal from the marker antenna using at least two receivers, measuring the phase of the reradiated signal detected with the at least two receivers, determining a distance between the marker antenna and each of the at least two receivers, determining the relative position of the marker antenna from the distance between the marker antenna and each of the at least two receivers, moving the marker antenna through the object, and selecting the marker antenna to reradiate a harmonic of the transmitter frequency.

The method may also include such steps as determining signal loss from a transmitter to a marker antenna to a detector, adjusting system component size such that the signal loss is acceptable for detecting a reradiated signal, using a dipole antenna to reradiate a signal at a harmonic of the transmitter frequency, and suppressing any second harmonic signal from a transmitter.

The system to effect the above described method for locating an object disposed within a first medium having a conductivity and a permittivity may include one or more elements such as a transmitter for producing a transmit signal so that the transmit signal has at least one transmitter frequency. The transmitter may preferably be movable in a second medium adjacent to the first medium. A target antenna is provided for the object such that the target antenna produces a reradiated signal upon being radiated with the transmit signal. A first receiver is tuned to the reradiated signal frequency. A comparison unit may be used that has a memory element operative for storage of the indicia of conductivity. The comparison unit and the memory element have circuitry for comparing the transmit signal and the reradiated signal to determine a relative position between the transmitter and the target antenna using the indicia of conductivity.

The memory element is preferably operative for storage of an indicia of the relative permittivity and the calculation unit and the memory element have circuitry for determining a relative position between the transmitter and the target antenna using the stored indicia of relative permittivity. The first medium may comprise earth and the second medium may comprise air. The first and second media may also both be air or another medium. An input device is preferably available as necessary for placing the indicia of conductivity and the indicia of permittivity within the memory element. A measurement unit for determining the conductivity and the permittivity of the first medium may be provided.

The target antenna may comprise an antenna having a non-linear element located at the optimum position for producing a harmonic of the transmitter frequency. Second and third receivers may be provided that are tuned to the reradiated signal. The target antenna is preferably a linear antenna and may comprise several forms including a dipole antenna, loop or magnetic antenna, a linear antenna fed off center or loaded off center, a trap to control the electrical length of the antenna, and the like.

The comparison unit above may include or be part of or separate from a calculation unit for calculating respective distances between each of the plurality of receivers and the target antenna. The calculation unit determines an X-Y position, or two dimensional position, of the target antenna that may be expressed in terms of measurement units from a reference from a selected reference point, or may determine an X-Y-Z position, or three dimensional position, of the target antenna.

The target antenna reflects a signal having a phase that reradiated varies with distance to each of the plurality of receivers, the calculation unit determining a difference between a respective phase detected at each of the plurality of receivers. Preferably, the non-linear element is less than one cubic centimeter in volume.

The system provides a means for locating an object buried up to at least about four meters deep. To achieve the necessary signal penetration through the soil, the system preferably uses at least one transmitter with the transmitter broadcasting in a frequency range of about 10 to 100 MHz. The antenna preferably has a length between 0.25 and 0.75 meters with the antenna having the non-linear element mounted thereto but may have a different length as desired so that 0.25 to 2.0 meters is a reasonable range considering factors such as convenience and depth of measurement. In some cases, such as that of buried pipes, the antenna is movable within the object or at least movable with respect to the object.

A register may be used to store a complex permittivity and conductivity related to the buried object such as that of the surrounding soil or other material.

The system may also be used for accurately determining a position of a movable object where the object is within a range of about one hundred or so meters. For instance, the object may be the hand or foot of an athlete whose position is analyzed to determine if maximum efficiency is obtained by the particular movement in question. The object could also be an object being deployed or recovered either by astronauts or the boom of a space craft. Other examples may include controllable devices whose movement may be directed in response to their position. Thus, the system may include one or more target antennas for one or more moveable objects. For these applications, smaller antennas and higher frequencies would generally be appropriate.

The plurality of receivers are positioned with a known spatial relationship to the at least one transmitter, the plurality of receivers being tuned to a frequency that is a harmonic of the transmitter frequency, and a calculation unit may be used for determining a relative position of the moveable object in at least two dimensions.

A memory storage unit may be used for storing the position of the moveable object so as to provide a trail or time signature of movement of the moveable object with respect to time and a control unit may be provided to produce control signals in response to the relative position of the moveable object.

It is an object of the present invention to provide an improved system and method for locating a proximately positioned object such as a proximately positioned buried object.

It is another object of the present invention to provide a system that uses an indicia related to the permittivity and indicia related to the conductivity of the medium in which the object to be located is buried.

It is yet another object of the present invention to provide a system with components and operating frequencies designed to permit detection of buried objects at a depth of several meters.

It is yet another object of the present invention to provide a locating that is accurate to within a few centimeters for buried objects.

It is yet another object of the present invention to provide a system that can record the path taken by a proximately located object through the air in a two or three dimensional framework with a high degree of accuracy.

A feature of the present invention is a calculation unit that determines distance between an object and a receiver based on the relative permittivity of the medium, such as soil.

Another feature of the present invention is an antenna adjacent the buried object having a non-linear element for producing a harmonic of a transmitter frequency.

Yet another feature of the present invention includes the step of inserting a dipole antenna into a conduit that runs underground and moving the dipole antenna through the conduit for determining the position of the conduit.

Yet another feature of the present invention include use of an antenna that may be a dipole or loop antenna that includes a diode element and/or trap.

Yet another feature of the present invention includes use of a dipole antenna that is fed off center and/or includes an centrally offset load or trap.

An advantage of the present invention is a highly accurate three-dimensional determination of an underground object.

Another advantage of the present invention is a relatively quick search time.

Yet another advantage of the present invention is an accurate object position determination for depths up to about four meters and for variable soil conditions.

These and other objects, features, and advantages of the present invention will become apparent from the drawings, the descriptions given herein, and, the appended claims.

BRIEF DESCRIPTION OF THE DRAWINGS

FIG. 3 is a diagrammatic view of a system in accord with the present invention showing the relative position elements thereof within a three-dimensional X-Y-Z coordinate system;

FIG. 4 is a diagrammatic view showing moveable objects with antennas and their path of movement;

FIG. 5 is a chart that shows a prediction of phase error measurement for a specified set of conditions regarding underground measurement of the location of a pipe;

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF THE PREFERRED EMBODIMENTS

Figure 1:
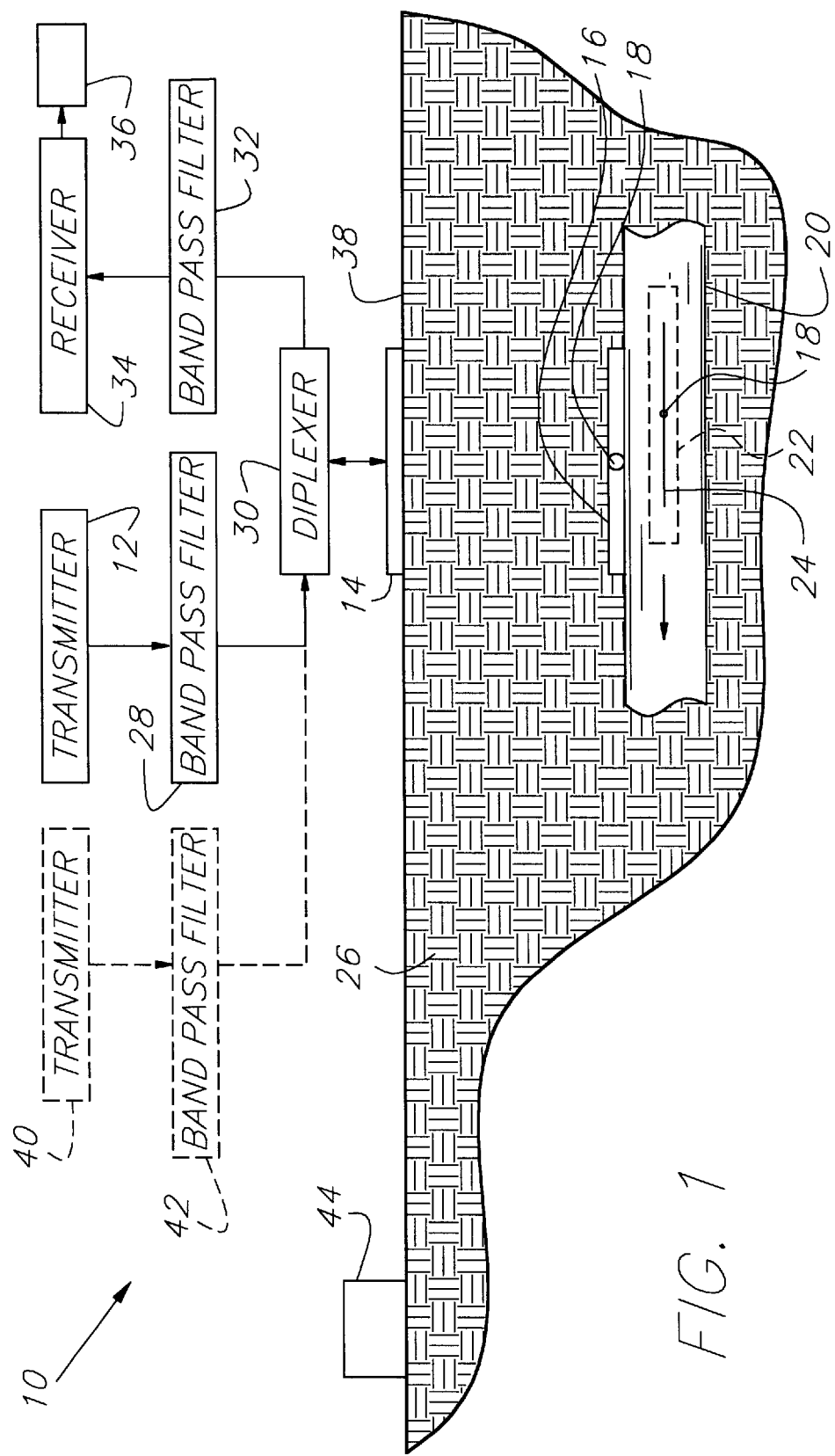
FIG. 1 is a diagrammatic view, partially in section, of a basic block diagram of a system in accord with the present invention.

Referring now to the drawings, and more particularly to FIG. 1, the general operation of a basic single receiver configuration of a locating system in accord with the present invention, such as locating system 10, is illustrated. Essentially, the system is capable of locating a buried object by first determining a distance between the buried object and each of one or more receivers. From this measured information and other known information, the location of the object may be determined.

Transmitter 12 produces a transmit signal with a single transmitter frequency at surface antenna 14. A one watt continuous wave transmitter operating at 50 MHz should be sufficient for locating natural gas pipelines buried up to about four meters deep or so. Power adjustments, frequency adjustments, and receiver sensitivity adjustments can be made if necessary to increase the range of depth detection. System losses are discussed subsequently. The transmitter frequency is chosen to be low enough to provide sufficient soil penetration over a wide range of soil conditions and still high enough to keep surface antenna 14 at a convenient length of approximately 0.5 meters. Generally, a transmitter frequency or frequencies in the range from about 10 MHz to about 100 MHz is preferably used but a limitation to this range of frequencies is not absolutely necessary. However, if the present invention is used for other purposes that do not require the signal to pass through soil as discussed subsequently, the transmitter frequency will generally be higher or adjusted to other conditions as may be desired.

Buried antenna 16, also referred to as the target antenna, is excited by the transmit signal and reradiates a signal at a different frequency than the transmit signal. In the presently preferred embodiment, the reradiated signal is a harmonic or mixer product of the transmitter frequency or frequencies. The second harmonic, which is one presently preferred possibility for the reradiated signal frequency, is selected so that the reradiated signal penetrates the soil sufficiently to be received at the surface. If the transmitter frequency is 50 MHz, then the reradiated signal has a frequency of 100 MHz for the second harmonic. Band pass filter 28 and diplexer 30 are required to severely suppress any second harmonic signal from transmitter 12. Likewise, bandpass filter 32 passes the second harmonic frequency but blocks the transmitter frequency for a good signal-to-noise ratio at receiver 34 of the reradiated signal. Indicator 36 may be a simple signal strength meter or include a computing unit to provide a straight-line distance between surface antenna 14 and buried antenna 16 as determined using the conductivity and relative permittivity of soil medium 26 calculated in a manner discussed hereinafter.

The present invention preferably uses an inexpensive wire for buried antenna 16 that may be a dipole antenna placed on or near a buried object, such as pipeline 20. If pipeline 20 is metallic, then target antenna 16 is placed slightly offset from pipeline 20 either above or to the side thereof. If pipeline 20 is non-metallic, then target antenna 16 is preferably positioned either inside or built into or attached to the wall of pipeline 20 prior to being buried. Target antenna 16 may also be a loop or magnetic antenna preferably oriented substantially horizontally or parallel with respect to surface 38 as shown. The system discussed hereinafter will provide positional correction if the antenna is not perfectly horizontally oriented although this orientation is preferred to maximize signal strength. If target antenna 16 is not initially buried with pipeline 20, it may be possible to introduce target antenna 24 into pipeline 20 within pig 22 or other means to move target antenna 24 along the length of pipeline 20 for determining its position. Pig 22 or such means are known to pipeline operators for cleaning the pipeline and for other purposes so that features of pig 22 are not disclosed herein and it will be understood that a suitable pig may be modified to use with target antenna 24.

Target antenna 16 or 24 are preferably no more; than a linear antenna, such as a wire, with a passive non-linear load and/or trap package 18 at the center thereof. Target antenna 16 is preferably about 0.5 meters long when used for locating buried objects in a soil medium 26. This length is chosen for convenience as well as functionality for reradiating at a suitable frequency and could be longer or shorter. A reasonable working range might be from 0.25 meters to 2 meters. Transmit antenna 14 or target antenna 16 or 24 could include use of other types of antennas such as a loop antenna or magnetic antenna, if desired. Non-linear load 18 may be used with a loop antenna.

Non-linear load 18 may include or be a diode, transistor, or other non-linear device so as to generate a harmonic of the transmitter frequency. Non-linear load 18 is less than one cubic centimeter in volume but may be quite small. As discussed hereinafter, the system essentially detects the position of non-linear load 18 to thereby provide a pinpointed, usefully precise position. Thus, target antenna 16 is preferably a dipole antenna with load package 18 connected at an optimal position along its length. Depending on frequencies, antenna lengths, and other such factors, there may be some circumstances where load package 18 is preferably positioned off center, transmitter antenna may be provided with an off center feed as indicated by line 17, and both transmit and target antennas may comprise a centrally positioned or off center trap, which may be part of load package 18 or part of off center feed 17, as discussed subsequently.

A resonant trap 15 or that may also be indicated by load package 18 such as a parallel resonant circuit may be added to either the transmitter antenna 14 or the target antenna 16 or 24. Trap 15 is indicated as a dotted line along the length of the transmitter antenna to emphasize or clarify that the trap may be positioned at the optimal position in the antenna, as desired. The trap construction can vary significantly, as discussed below.

The trap is used to electrically change the length of the antenna for optimum impedance matching at the frequency of operation. At the higher frequency operation such as the second harmonic frequency operation, the trap is positioned so as to effectively shorten the antenna. At its resonant frequency the trap provides a high impedance to the signal that, depending on the position of the trap along the length of the antenna, limits the antenna length available to the signal, to thereby shorten the antenna length and so improve impedance matching at the higher frequency. At the lower frequency operation, the trap does not resonate and is effectively invisible so that the whole antenna length is used. The relatively longer antenna length at lower frequencies so obtained provides a better impedance match. At frequencies roughly below 100 MHz, the trap may preferably comprise of electronic components such as an inductor and capacitor with values selected to be tuned to the desired resonant frequency. At higher frequencies, techniques may be used to implement the trap components such as making one portion of the antenna narrow to act as an inductor between two wider portions of the antenna that act as capacitances. The trap may also be included in load package 18 along with the non-linear element.

Conductivity/permittivity measurement apparatus 44 is preferably used to obtain the conductivity and complex permittivity of soil 26. Conductivity and permittivity information may also be obtained from reference data. Such data for various regions and areas is published in reference books, libraries, Internet, and the like and could be used to effect reasonable accuracy. Simulations of methods discussed for calculating position coordinates indicate that some inaccuracies in these items may tend to cancel out to a certain degree. Dry soil tends to have low conductivity and a low relative dielectric constant while wet soil tends to have high conductivity and a high relative dielectric constant. Other factors such as soil type and composition also affect the complex permittivity of the soil. A completely homogenous medium is not required. For instance, Applicants have had success in accurately locating gas pipes that run underneath a paved road. It will be noted that the road did not have metallic mesh cement supports, as many highways may have.

A direct measurement of conductivity/permittivity is likely to provide the most accurate information due to rainfall variations, drainage, and the like. It may be advisable to make a few measurements at various positions and depths because the measurements may typically vary within the region in which testing will occur. However, the result of errors due to such variations still allows location determination within the desired accuracy for most situations. Applicants have evaluated the system of the present invention using computer models for a wide range of conductivities from about 0.001 to about 0.1 mhos per meter that encompass most soil conductivities expected to be encountered. This is discussed hereinafter in the context of antenna signal coupling and system losses. As well, Applicants have investigated the effects of a wide range of relative permittivities from about 1 to 80. The results of such computer simulated testing indicate that the system will be suitably accurate under a wide variety of conditions.

In discussing the units or quantities measured, it will be understood that indicias that indicate the same units as conductivity and relative permittivity may also often be measured such as resistivity, capacitance, relative dielectric constant, and the like. Therefore, while specific units may be used in this specification for convenience of description for the reader, the invention and claims thereto are not to be read as being limited to such specific units. Rather, the invention covers not only the specifically named units but also the related units or quantities from which the named units can be readily determined or which may be substituted where desired, or where such may be convenient depending on the type of measuring or computing device used, or for other similar reasons.

Those skilled in the art will also be aware of instruments to perform such measurements directly. For instance, Hewlett Packard manufactures a probe to determine the complex permittivity of soil. As well, dedicated instruments used for this purpose can be constructed so that measurement apparatus 44 may be conveniently designed into system 10 or 100, if desired. For instance, phase angle change and amplitude change information has been used to provide conductivity and permittivity information of soil for fixed position transmitters and receiver, such as for use with oil well logging tools. Thus, the present instrument's own transmitter and receiver elements that have a known and fixed spatial relationship could, if desired be used for directly measuring such soil information by suitable programming without the need for a significant amount of additional hardware.

Using this information it is then possible to accurately determine the distance between one or more surface antennas 14 and target antenna 16 using the following relationship:

Distance (between transmitter and target antennas)=Measured phase angle/Beta, where Beta is a function of conductivity and permittivity of the medium between the transmitter and target antennas.

Transmitter 40 is shown in dashed with Band Pass Filter 42 to indicate that more than one transmit frequency may be used. If more than one transmitter frequency is used, then one of the products produced by target antenna 16 will be enhanced and reradiated. This technique has the advantage of eliminating errors caused by transmitter broadcast of the second harmonic components. It also eliminates the need to provide extreme suppression of such harmonics with filter elements, as indicated. Another transmitter embodiment could passively modulate the reradiated signal with a digital code. This technique would enhance detection in the presence of extraneous, self-generated, or other noise.

Figure 2:
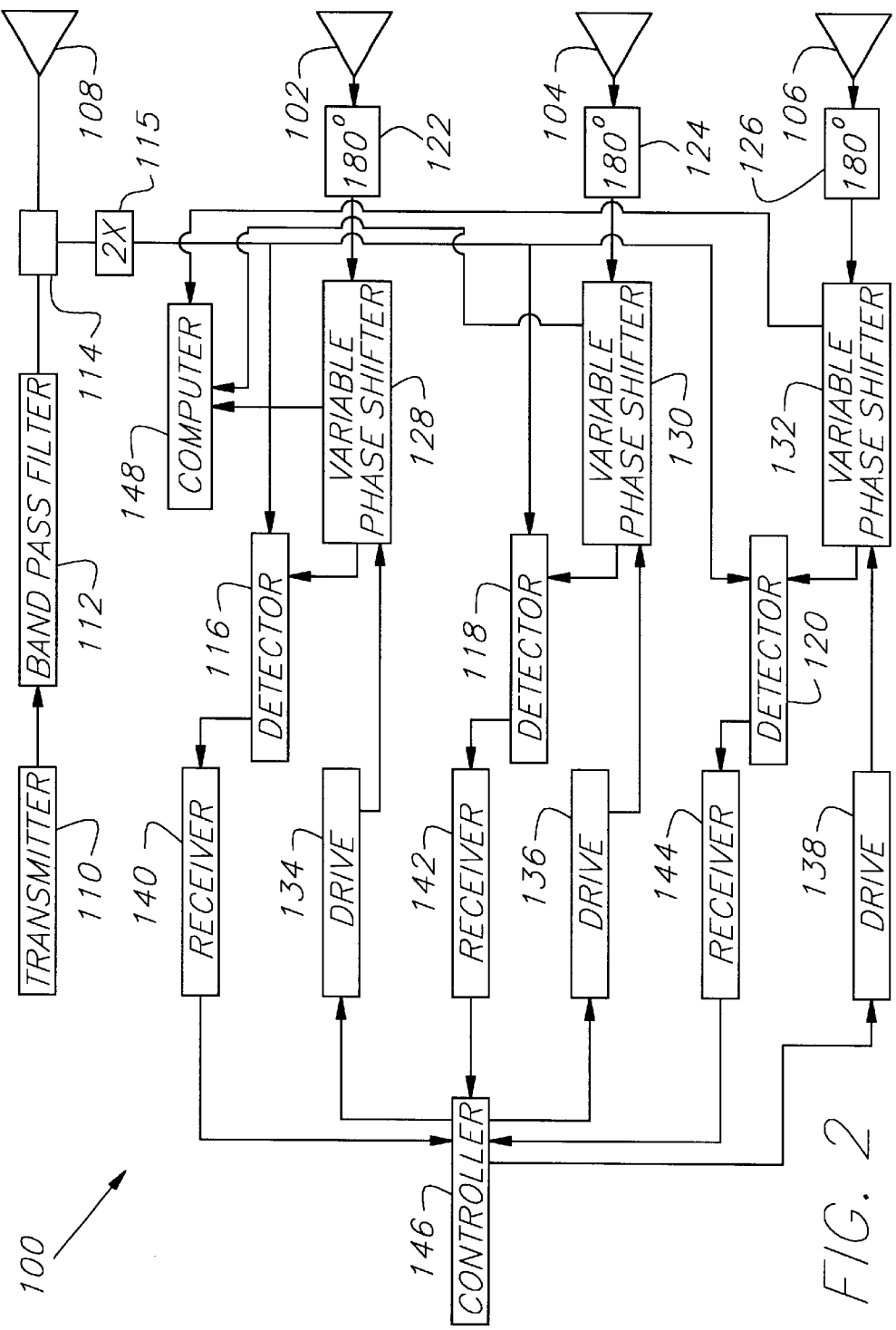
FIG. 2 is a block diagram of a system in accord with the present invention having a sufficient number of receivers to provide a three-dimensional position determination.

While system 10 of FIG. 1 is essentially incorporated into precision system 100 of FIG. 2, it will be understood that system 10 of FIG. 1 can be used as a simplified stand alone system, if desired. The signal phase variations that are preferably measured by systems 10 and 100, along with conductivity and relative permittivity of the soil as discussed hereinafter, can be used to obtain an accurate location of buried antenna 16 with system 10. In system 10, buried antenna 16 is fairly quickly located by making successive measurements between surface antenna 14 and buried antenna 16 until the shortest distance is measured. The shortest distance is measured when the surface antenna 14 is directly above buried antenna 16. That distance is the depth of buried antenna 16 and is accurate within a few centimeters. The measurements are preferably made with surface antenna 14 placed on or near surface 38 of the soil. It may also be desirable to use raw phase measurements to locate buried antenna 16. Furthermore, raw phase measurements may be calibrated in terms of distance for a particular medium.

While the present invention preferably detects phase variations of the signal to determine a distance accurate within centimeters, the amplitude of the polarized signal such as produced by a dipole target and surface antenna can also be monitored if indicator 36 is simply an inexpensive signal strength indicator rather than a more accurate phase detector, preferably with a computer programed to calculate distance or other means for distance determination. The polarized signal is maximized when surface antenna 14 and buried antenna 16 are parallel. Once the operator moves surface antenna 14 until the antennas are parallel to maximize the signal strength indication, the operator moves in line with surface antenna 14 to again maximize the signal. Once the signal is again maximized, the operator should be at a position perpendicular to buried antenna 16. Therefore, the operator moves perpendicular to surface antenna 14 until the signal is again maximized. Assuming homogenous soil conditions, this procedure would place the surface antenna 14 above buried antenna 16. Thus, the polarized nature of the dipole antennas can be used to advantage to produce a version of the present invention that is very inexpensive, quite accurate, has a good range and is relatively quick as compared to the prior art. Although this embodiment is quite inexpensive and compares very favorably with presently available systems, this embodiment is not nearly as accurate or as quick as precision system 100 of FIG. 2 or as the preferred embodiment of system 10 discussed in the previous paragraph. Furthermore, this embodiment provides no accurate depth information.

Precision locating system 100 of FIG. 2 and FIG. 3 effectively incorporates locating system 10 shown in FIG. 1. Precision locating system 100 preferably includes at least three receiver antennas 102, 104, and 106 that receive a reradiated signal that is produced, in one embodiment, in response to a transmitter signal from transmitter antenna 108. Transmitter 110 produces one or more transmit frequencies as discussed above. Bandpass filter 112 may be used to suppress harmonics of the transmit frequency, as necessary. Directional coupler 114 passes most power to transmitter antenna 108 but also connects to detectors 116, 118, and 120 through frequency doubler 115 to provide a reference signal for use in determining phase change at the three receivers. In some cases, it may be desirable to use one of the receiver signals as the reference signal. For instance, if the system is used where it is possible to energize the target antenna independently, so as to avoid the need for system losses associated with energizing the target antenna via a separate transmitter antenna, then it would then be useful to have the reference signal as the signal from one of the three receivers. The reradiated signal measured at receiver antennas 102, 104, and 106 is phase shifted by 180 degrees in respective phase shift circuits 122, 124, and 126. The respective signals from phase shift circuits 122, 124, and 126 are applied to variable phase shift circuits 128, 130, and 132. Each variable phase shift circuit 128, 130, and 132 is controlled by respective drive circuits 134, 136, and 138. The drive circuits are controlled by controller 146. Controller 146 receives the respective difference signal from receivers 140, 142, and 144. Based on the difference signal received at receivers 140, 142, and 144 from the respective detectors 116, 118, and 120, each drive circuits controls a respective variable phase shift circuit to reduce each of the difference signals to zero. Each drive circuit applies a correction signal to its respective variable phase shift circuit to reduce the respective difference signal to zero. The correction signal, or a derivative thereof, is applied to computer 148 from variable phase shift circuits 128, 130, and 132, or from another source, as desired. Computer 148 may be used to calculate the distance between each receiver antenna 102, 104, and 106 to the target antenna using the general formula discussed above.

Once a respective distance between each receiver antenna 102, 104, and 106 with respect to target antenna 202 of FIG. 3 is known, the diagram of FIG. 3 suggests how the location coordinates x, y, z of diode 202 of antenna 206 can be determined so as to provide the location of one point in buried pipeline 204. Distances A, B, C, and D are as shown in FIG. 3. Distances A, B, and C are measured. Distances $z_0$ and $y_0$ are known for the receiver spacing where $z_0$ is distance 109 and $y_0$ is distance 107. Distance D can be calculated from the above known distances and is readily determined. Thus, the following equations can be solved to determine the location coordinates x, y, z of diode 202 in target antenna 206.

$$x^2+y^2+z^2-A^2=0,$$

$$x^2+(y-y_0)^2+Z^2-(A-dy)^2=0,$$

$$x^2+y^2+(z-z_0)^2-(A-dz)^2=0,$$

$$x^2+y^2+(z+z_0)^2-(A-dq)^2=0,$$

where:

A−dy=B,

A−dz=C, and

A−dq=D.

Thus, the three phase measurements of distance as applied to or determined by computer 148 can be used to provide four equations and four unknowns. These equations are solved for x, y, and z by an iteration technique. It will be understood that in some cases the phase and/or distance may be the actual phase or distance or may be represented by a signal, voltage level, or the like. Therefore, it will be understood that an indicia of the phase and/or distance, or description. in terms of phase and/or distance, will be presumed for purposes of this application to refer to any of the above or other means to express the phase and/or distance.

A computer program has been written to calculate the expected accuracy of the above given iteration technique for determining target antenna location indices x, y, and z. The computer program was designed to determine the sensitivity of the iteration technique to errors in measurements of phase, conductivity and relative permittivity. The results of the computer program indicate that the system will be accurate within a few centimeters for most operating conditions. Location errors are generally less than three percent and often less than one percent. In some cases, it is found that consistent errors in all three measurements, such as a consistent inaccuracy in all three phase measurements, may produce an answer wherein the inaccuracy is reduced in the final answer, i.e., the consistent errors cancel each other to a certain extent. An example of the results for a particular case is shown in FIG. 5. For the particular case of FIG. 5, it is presumed that the transmit frequency is 100 MHz, the relative dielectric constant of the soil is 9, the conductivity is 0.01 mhos/meter and Beta is 2291.127 degrees/meter.

It will also be understood that system losses occur in both signal directions to and from the target antenna. The system losses are affected by system parameters such as operation frequencies and antenna lengths. The system parameters are therefore chosen to minimize such losses. Losses are also caused by operating conditions such as the conductivity and relative permittivity of the soil as well as the depth of the target antenna. Even after the signal travels to the target antenna and is reradiated at a transmitter harmonic, the signal received at the receivers must not have experienced so much loss that it cannot be detected. Because of the lengths of the antennas and spacing selected for the use of the system in detecting buried objects, near field terms are important in coupling calculations to determine coupling between the transmitter antenna and the target antenna as well as between the target antenna and the receiver antennas. Plane wave attenuation far field calculations are therefore not appropriate and provide attenuations that are generally too high. Applicants have therefore used a computer program that calculates antenna coupling using the technique of Harrington's method of moments to evaluate the system of the present invention for losses over a wide variety of possible operating conditions. See, for reference, "Field Computation by Moment Methods", by Roger F. Harrington, MacMillan Press, 1968, that is incorporated herein by reference. Thus, system reliability for a wide variety of conditions has been considered and, based on computer analysis and simulation, is expected to be satisfactory for such varying conditions that may be encountered by the system whose construction details are also provided herein.

From such calculations, system signal margin calculations can be made. Assuming conditions such as for Chicago soil that may typically include a relative dielectric constant of 9, conductivity of 0.01 mhos/meter, transmitter frequency of 50 MHz, receiver frequency of 100 MHz, and a depth of the buried object of 2 meters, the following losses are calculated for the system:

| | |
|---|---|
| Antenna coupling at TX | 37 db |
| Antenna coupling at RX | 41 db |
| Relative strength of second harmonic | 20 db |
| Receive antenna mismatch | 10 db |
| Other system losses | 2 db |
| Total System Losses | 110 db |
| Transmitter power | +30 dbm |
| Receiver threshold | −120 dbm |
| System Losses that can Be accommodated for 0db signal-to-noise ratio | 150 db |
| System Losses that can Be accommodated for 20 db | 130 db signal to noise gain |

Because of the large signal margin shown in the above case, it will be understood that greater target antenna depths should be achievable and/or more deleterious soil conditions can be accommodated by this system having the above system parameters using lower frequencies, higher transmit power levels, and/or lower receiver thresholds.

In operation, and depending on the relative spacing between receivers 102, 104, and 106, and the distance to the target antenna, it may be desirable to operate system 100 using only one receiver until the operator is within a few meters whereupon the resolution of the precision system permits an accurate location, within centimeters, of the buried object making only one measurement. An additional measurement may typically be made from another, preferably closer position for verification purposes. The greater the relative spacing between receivers 102, 104, and 106 as compared to the distance between the receivers and the buried object, the greater is the resolution of the system. As the receivers are placed closer together or as the distance to the target antenna 16 increases, the resolution will tend to decrease. For a reasonable balance between convenience and good resolution for the typical situation of finding a buried pipe, the relative receiver spacing in system 100 is about one meter, although wider or shorter spacings could be used as desired and still provide for an easily transportable system. The fact that only one or two measurements are required results in a quick and easily transportable system to operate even if wider spacings should be desired. The spacings required for use with a target antenna 16 in air as discussed hereinafter may be significantly different, because the accuracy of measurements will tend to be much higher.

Figure 6:
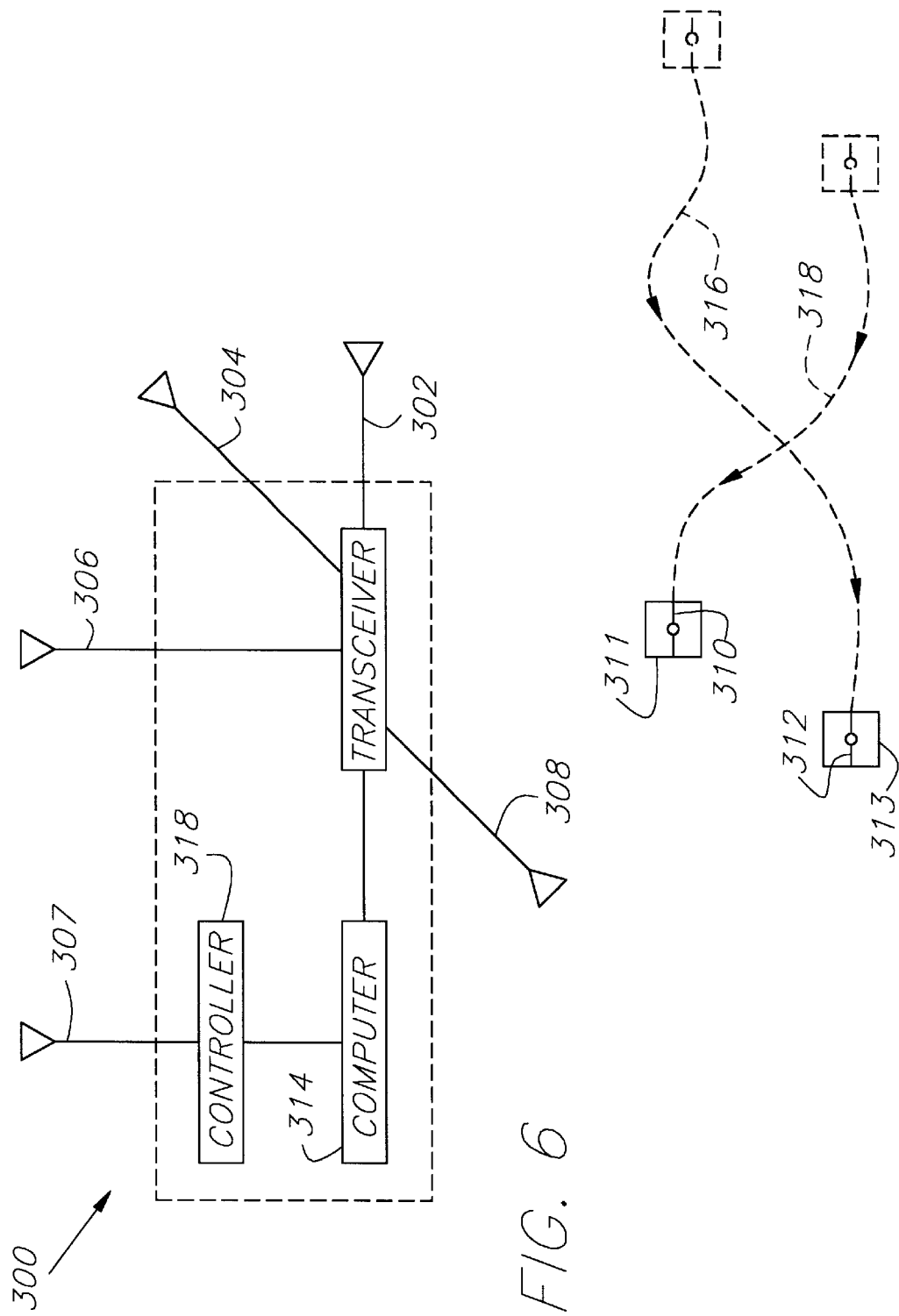
FIG. 6 is a block diagram of a block system that may be used to remotely monitor, record, and/or control the path of movement of objects such as those of FIG. 4 in accord with the present invention.

While the above description has been directed to the location of buried objects, the present invention is not limited to such uses. In fact, there are many possible uses for the highly accurate method of pinpointing the position of an object and tracking the object as taught by the present invention which applications may range from ergodynamic studies to control systems. FIG. 4 and 6 illustrates generally the usage of the present invention for such purposes. System 300, includes a transmitter antenna 302, as discussed above, as well as three receiver antennas 304, 306, and 308. It will be understood that the antenna frequency and length limitations described to maximize operation of the system for use in locating buried devices do not necessarily apply. As well, losses and coupling will tend to be significantly different. However, generally the system operates as discussed above.

Transmitter antenna 302 may produce a signal to energize one or more target antennas such as antennas 310 and 312 for respective objects shown in FIG. 4 such as items 311 and 313. If more than one target antenna is necessary for a particular application, the target antenna length can be adapted to produce a different reradiated harmonic frequency signal, or the reradiated signal can be passively modulated by a digital code, or otherwise distinguished. As well, where applicable, it may be desirable to energize 310 and 312 with a local transmitter.

Computer 314 can be used to detect and store information for tracking purposes such as track 316 or 318 that shows the path taken or time signature of objects 312 and 310, respectively. Tracks or time signatures 316 and 318 may be compiled by recording positions of 310 and 312 with an appropriate sampling rate that will provide sufficient tracking resolution for the particular use desired. For instance, to track an antenna located in the shoe of a pole vaulter for later analysis, it may be desirable to obtain 10 to 100 samples per second to be adequate for efficiency analysis purposes.

Other applications may preferably do more than simply store data for playback and analysis purposes. For instance, control systems may preferably use real time data rather stored data. The real time positional data may be compared to a desired position stored in the computer and used by computer 314 to provide control signals to controller 318 to objects 311 or 313 via control signal antenna 307 to respond as necessary. In the case of athletic training, control signals in the form of audio commands could be provided to perform the desired function at precisely the right moment, e.g., to tell a diver exactly when to extend from a tucked spinning position so as to enter the water with a minimum splash, or to determine whether a pitched ball is projected to be in the strike zone and to calculate whether a batter should swing and, if so, to signal the precise moment to begin the swing so as to enhance batting practice. An electronic umpire might be developed for local league games where finding an umpire is difficult. It will be noted that calculations may require extensive computations, as per the iteration technique discussed above, and therefore practical control applications may be limited by computer speeds. Thus, some operations may be limited or rendered impractical by the need for more expensive computers, based on today's computer costs that are rapidly dropping, that can perform the necessary calculations for the desired operation. However, the ability to determine, track, and/or use in real time three dimensional object information may be useful for many activities where spatial movement is involved.

Figure 7:
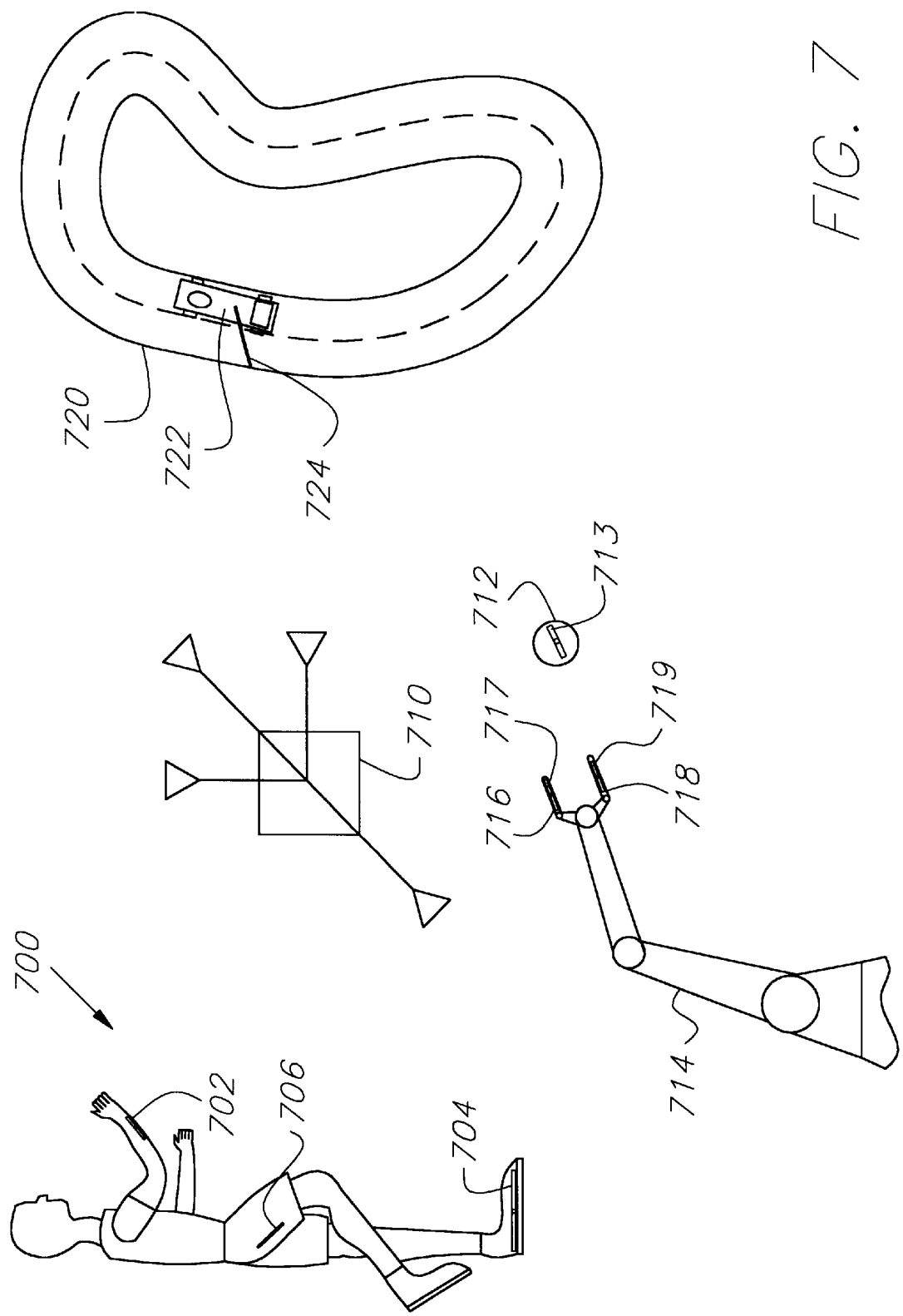
FIG. 7 is a figurative view of a system in accord with the present invention as may be implemented for monitoring/controlling various types of movement.

FIG. 7 figuratively discloses a few examples of uses for the present invention although it will be understood that numerous applications exist ranging from controlling pens for large scale construction drawings, painting signs, model boat or airplane control, to robotic arm control on a spacecraft. Other types of systems already exist for providing position locating information that has proved very valuable such as information provided by satellites and positioning of planes. Those systems for providing such information tends to be quite large, not readily portable, and may not be accurate enough for locating items that are proximately positioned with respect to the sensors. Similarly, triangularization methods have been used with large scale antenna systems to locate a signal from three directions when distance information is not available. On the other hand, Applicants' portable system may be used for tracking/controlling positions of items closer than one meter or as far away as one hundred meters or more and with a relatively high accuracy.

Running figure 700 of FIG. 7 indicates how the present invention may be used with one or more antennas for analyzing a runner's form. Antenna 702 may be placed on a hand and/or antenna 704 on the shoe or 706 on the pants leg for tracking purposes. Data may then be recorded using the system of the present invention with sensor and computerized recorder system 710 as described here in before and as modified for the particular application. For instance, the antennas may preferably be shorter and higher frequencies used. System 710 receiver antennas may require a larger spacing to provide suitable resolution over the track or segment of track of interest. Subsequent analysis may be made to determine if the tracked item, such as the hand or foot, was used in the most efficient manner. Presently available systems for this purpose may require digitized film and suitable marking of the digitized film that may introduce errors. Such methods may also require a significant amount of time to produce the desired tracking information. As well, such methods may not readily provide velocities, changes in velocities, and so forth that might be desired to locate a lack of smoothness of movement or other particular movement information of interest. It will be understood that the present invention is also suited monitoring very localized movement, within a close range of five feet or less with a high degree of accuracy as may be desired for a wide range of ergodynamic analysis.

To illustrate a control process in accord with the present invention, robotic arm of FIG. 7 is required to grab or aid in grabbing a moving object, such as ball or satellite or object 712 that is separate from robotic arm 714. Arm 714 may also be moving with respect to the receivers. Object 712 may have thereon antenna 713 and grip elements 716 and 718 may have corresponding antennas 717 and 719. The present invention may be used to track the relative position of both object 712 and grip elements 716 and 718 so as to move arm 714 close to or in engagement with object 712. Thus, the present invention may be used to coordinate movement between unconnected, moveable elements, that may be otherwise difficult to control. However, as discussed above, real time control requires considerable calculating speed.

A final illustration of the present invention requires only two dimensional control. A model car 722 (or boat) that may be controlled to follow a path or track around race track 720 or other path or route. Computer 710 may be programmed to determine the boundaries of race track 720 by monitoring movement of target antenna 724 as the operator manually control model car 722 to move around the track several times to thereby determine the boundaries of operation. After the boundaries of race track 720 are known, computer 710 may then be used to further control movement, calculate maximum turning speeds, respond instantaneously and accurately, and so forth. Using a high sampling speed to make instantaneous control, computer 710 may control car 722 in a manner that may be comparable or, in some ways, improved with respect to human control, depending on computer speed that may be available. In some cases with this or other examples given previously, it may be desirable to energize the target antenna locally such as with a local oscillator, to avoid the system losses associated with energizing the target antenna, such as target antenna 724 using a separate transmitter antenna. In some cases where practical, this may improve system response.

The foregoing disclosure and description of the invention is illustrative and explanatory only. Various changes or features may be added where desired. The number of receivers can be varied. In some cases, it may be more practical to make the target transmitter an active element rather than passive element. As well, the means for determining the distance may be accomplished with pulsed signals rather than through measuring phase shift. It will appreciated by those skilled in the art, that various changes in the size, shape and materials as well as in the details of the illustrated construction or combinations of features of the various elements may be made without departing from the spirit of the invention.

What is claimed is:

1. A method for controlling two objects relatively moveable with respect to each other, comprising:

radiating from each of said two objects, a distinctive microwave signal in the 10 Mhz to 100 Mhz frequency range;

detecting said two distinctive signals with a plurality of receivers;

determining a plurality of indicia of distance between said two objects and respective of said plurality of receivers; and determining indicia of relative position of said two objects from said plurality of indicia of distance.

2. The method of claim 1, further comprising:

producing a control signal in response to said indicia of relative position of said two objects.

3. The method of claim 2, further comprising:

transmitting said control signal to at least one of said two objects.

4. The method of claim 1, further comprising:

successively recording said indicia of relative position of said two objects.

5. A method for controlling two objects relatively moveable with respect to each other, comprising:

radiating two distinctive signals respectively from each of said two objects;

detecting said two distinctive signals with a plurality of receivers;

determining a plurality of indicia of distance between said two objects and resprective of said plurality of receivers;

determining indicia of relative position of said two objects from said plurality of indicia of distance, and producing a control signal in response to said indicia of relative position of said two objects.

* * * * *